3,249,631
NITRATE ESTER OF POLYVINYLENE GLYCOL
Louis M. Soffer, Aberdeen, Md., assignor to the United States of America as represented by the Secretary of the Army
No Drawing. Filed Aug. 10, 1956, Ser. No. 603,453
5 Claims. (Cl. 260—467)

The invention described herein may be manufactured and used by or for the Government for governmental purposes without payment to me of any royalty thereon.

This invention relates to resinous polymers and more particularly to nitrated polymers having a high $NO_2$—carbon ratio. Specifically this invention relates to the hitherto unknown, essentially linear nitrate ester of polyvinylene glycol, hereafter referred to as polyvinylene glycol dinitrate.

A primary object of this invention is the preparation of a polymer which consists largely of, or contains in substantial amounts, a plurality of structural units having the formula

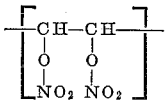

A further object of the invention is the preparation of a new solid propellant for guns and rockets, having an unusually high ratio of nitrate ester groups per carbon atom.

A still further object of the invention is to prepare a resinous, essentially linear polymer having a ratio of nitrate ester groups to CH residue of 1:1.

Another object of the invention is the preparation of a nitrate ester of polyvinylene glycol having a nitrate nitrogen content in the range of from 15–18.6%.

More specifically the object of this invention is the preparation of polyvinylene glycol dinitrate. I have now found that polyvinylene glycol dinitrate may conveniently be prepared in high yields by the nitration of polyvinylene glycol. Briefly vinylene carbonate is polymerized by means of either ultra violet irradiation or aqueous emulsion polymerization to yield polyvinylene carbonate. The latter substance is saponified with aqueous alkali solution in the presence or absence of sodium borohydride yielding polyvinylene glycol. The glycol is then nitrated with nitric acid—acetic anhydride—acetic acid, or with 100% nitric acid alone, to produce polyvinylene glycol dinitrate according to the following general reactions, the details of which will be described more fully hereinafter.

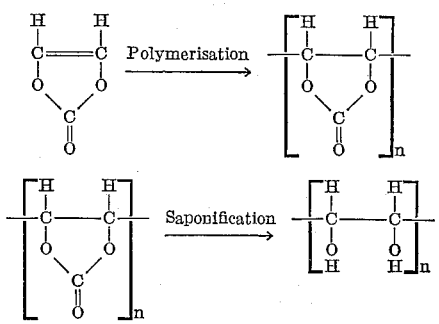

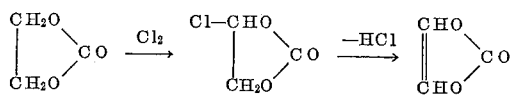

The monomer vinylene carbonate from which the polyvinylene glycol dinitrate of this invention is derived was first reported by M. S. Newman and R. W. Addor in 1953 and has been discussed in two publications (J. Am. Chem. Soc., 75, 1263, 1953, and J. Am. Chem. Soc., 77, 3789, 1955). The original preparation with minor modifications was used in the development of this invention. Newman and Addor reported the synthesis of the cyclic carbonate by the dehydrochlorination of chloroethylene carbonate formed by the chlorination of ethylene carbonate according to the following reaction

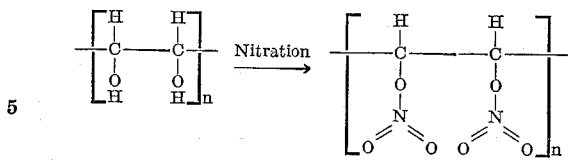

In their first publication Newman and Addor reported that vinylene carbonate "polymerizes to yield clear, colorless solid polymers which on hydrolysis yield water soluble polymers. The repeating unit of the hydrolyzed polymers is undoubtedly ͱCHOHͲ$_n$." No further description of the polymers obtained from vinylene carbonate was made, nor was there any information on the "water-soluble polymers" obtained in hydrolysis which they believed had the structure —(CHOH). In their second publication Newman and Addor again spoke of the polymers obtainable from vinylene carbonate which "on hydrolysis" . . . would lead to other polymers "containing adjacent hydroxyl groups." They reported "a few experiments showed that vinylene carbonate could be polymerized by heating with benzoyl peroxide. The polymeric mixtures formed ranged from clear viscous liquids to tough plastic solids which became hard and brittle upon exposure to air." These polymers showed strong carbonyl absorption at 5.55 microns (1800 cm.$^{-1}$). In addition it was reported that the "gelatinous solid which was obtained by treating polymer with potassium hydroxide solution showed hydroxyl absorption at 3.0 microns (3320 cm.$^{-1}$) and a lack of carbonyl absorption." No other pertinent information or proof of structure was given.

Polyvinylene carbonate differs from polyvinylethylene carbonate discussed, but not claimed, by W. W. Prichard (U.S. Patent 2,511,942, June 20, 1950) in that the pair of carbon atoms completing the cyclic carbonates structure are the ones actually responsible for polymerization, because there are no other carbons present in the monomer vinylene carbonate. In Prichard's case, the vinyl moiety responsible for polymerization is completely external to the cyclic carbonate.

Polyvinylene carbonate differs in the same way, and for the same reasons, from the polymeric vinylethylene carbonate described and claimed by R. M. Joyce, Jr. (U.S. Patent 2,518,440, August 15, 1950).

The following specific examples of methods of preparing the dinitrate of this invention are to be considered as illustrative only and not in any manner as limiting the scope of the invention.

POLYVINYLENE CARBONATE

Polyvinylene carbonate, as used in the preparation of the polyvinylene glycol dinitrate of this invention, should preferably have the following characteristics: The material should be a white powder which exhibits, under infrared radiation, a strong carbonate absorption at 5.5 microns; no hydroxyl absorption at 3.0 microns, and no carbon-carbon double bond absorption at 6.2 microns. The material should be soluble in both acetone and pyridine. Saponification of the polymer in aqueous alkali solutions should yield a product of high hydroxyl content (strong infrared absorption at 3.0 microns) and no carbonate content (no infrared absorption at 5.5 microns). The product of saponification, polyvinylene glycol, should be capable of yielding a nitrate, polyvinylene glycol dinitrate, of at least 17–17.9% nitrate nitrogen.

The following examples, illustrating preferred methods for the preparation of polyvinylene carbonate, may be grouped into two principle categories, namely; (1) polymerization of the monomer by exposure to ultra violet radiation, and (2) as an optional method the polyvinylene carbonate may be formed by the polymerization of the monomer in an aqueous emulsion.

(a) Aqueous emulsion polymerization

EXAMPLE I 4 grams of the vinylene carbonate monomer, 4 grams distilled water, 0.005 gram sodium bisulfite (meta) and 0.005 gram ammonium persulfate were shaken for 16 hours in a sealed, degassed Pyrex tube. The gelatinous white product thus obtained was triturated first with ether, and then water. The solid was then dried at 110° C. and subsequently in vacuo overnight. The almost white powder resulting weighed 0.51 gr. and possessed the following characteristics; soluble in dilute sodium carbonate and in acetone; the infrared curve showed strong carbonate and no hydroxyl absorption and no evidence of the presence of carbon-carbon double bonds. Capillary melting point behavior tests showed that at 230° C. the product was gray and at 280° C. it was a gray-brown. There was no evidence of swelling, charring or decomposition under 300° C.

EXAMPLE II 5.1 parts of the monomer ($n_D^{25}$ 1.4198), 6 parts water, 0.12 parts methyl ethyl ketone peroxide solution (60%), and 0.0025 part sodium lauryl sulfonate were shaken mechanically for 3 days at room temperature. The product was isolated and dried in the manner described in Example I. A yield of 1.43 grams was obtained. The infrared spectrum was the same as in Example I. The product was soluble in pyridine and insoluble in acetone.

(b) Polymerization by ultra-violet irradiation

EXAMPLE III

Four parts of monomer ($n_D^{24.5}$ 1.4196) and 45 parts anhydrous ether (Reagent grade) were refluxed in a quartz flask for 60 hours while exposed to ultraviolet radiation. The cream-white product was isolated and dried as in Example I. The melting point behavior was as follows: gray to yellow at 110° C.; yellow-orange at 140° C. with shrinking; swelling, orange color and evolution of gas at 180° C. The product had the usual infrared absorption at 5.5 due to cyclic carbonate. It was insoluble in cold sodium hydroxide, hot or cold ethanol, hot or cold ethyl acetate, and hot or cold tetrahydrofuran. It was soluble in pyridine and in dimethylformamide.

As illustrated by the above examples, vinylene carbonate may be polymerized by ultra violet irradiation in Vycor, quartz, or Pyrex flasks, in the presence or absence of a catalyst such as benzoyl peroxide or methyl ethyl ketone peroxide and in the presence or absence of a solvent such as ethyl ether or tetrahydrofuran, at temperatures up to 80–85° C. for periods ranging up to 7 days. The polymer is optionally produced by shaking an aqueous emulsion of the material in the presence of ammonium or potassium persulfate, sodium bisulfite or methyl ethyl ketone peroxide. The use of sodium lauryl sulfonate in the above emulsions is optional.

In addition to its use for the preparation of polyvinylene glycol dinitrate, polyvinylene carbonate should be useful in plastics, resins, coatings, filaments and the manufacture of molding articles. In a satisfactory organic solvent it can be made into varnishes, and lacquers with or without the addition of other resinous bodies.

It may also be successfully applied to the manufacture of laminated sheets of materials such as glass, cellulose nitrate, cellulose acetate or wood. It may be used in the impregnation of fabrics, wood, etc., for purposes of waterproofing and preservation; or extruded in the form of film or sheet. Plasticizers can be incorporated in the polymer prior to molding.

POLYVINYLENE GLYCOL

Polyvinylene glycol as obtained by the saponification of polyvinylene carbonate should have the following desirable characteristics. The material should be a white powder with carbon and hydrogen analysis in close agreement with the theoretical. It should possess strong hydroxyl infrared absorption at 3.0 microns and no carbonate absorption at 5.5 microns. A starch-iodide test should give negative results. The material should be soluble in 100% nitric acid at room temperature. An assay of vicinal glycol content by the Malaprade reaction should give results at least 90% of theoretical. Finally the material should be capable of nitration to a 17.0–17.9% nitrate nitrogen level.

Polyvinylene glycol is a unique, polyhydroxylic polymer of potential use wherever cellulose, polyvinyl alcohol or other poyhydroxylic materials are now employed. These include synthetic fibers, plastics resins, filaments and blood extenders. It is particularly unique in that in all previously known polyhydroxylic polymers both natural, such as cellulose and starch, and synthetic, such as polyvinyl alcohol and polyvinylethylene glycol polymers there has been an hydroxyl to carbon ratio of 2 to 1 or higher, whereas in polyvinylene glycol there is an hydroxyl to carbon ratio of 1. Of greater significance is the fact that 3 of the 4 above-mentioned polymers are either used in solid propellants in the form of their nitrate esters, such as nitrocellulose, or have at one or more times been seriously considered for use as solid propellants, such as nitrostarch and polyvinyl nitrate. Polyvinylene glycol is particularly unique in that whereas cellulose and polyvinylethylene glycol contain both secondary and primary hydroxyls, it contains, as does polyvinyl alcohol, only secondary hydroxyls. It differs from polyvinyl alcohol, as has already been mentioned, in that it contains 1 hydroxyl for every carbon, or twice as many hydroxyls per unit weight as does the former.

The following examples are illustrative of preferred methods by which polyvinylene glycol may be prepared for use in the production of polyvinylene glycol dinitrate:

EXAMPLE IV

One part of polyvinylene carbonate was stirred at room temperature with 0.2 part sodium borohydride and 32 parts of 15% sodium hydroxide solution. The mixture was then precipitated by addition to an excess of 95% ethanol and the resulting solid was washed with ethanol. It was then agitated with diluted aqueous hydrochloric acid and the acid removed by washing with water. A yield amounting to 57% of theoretical was obtained. The infrared curve showed strong hydroxyl absorption and no carbonate absorption.

EXAMPLE V

Three parts polyvinylene carbonate, two parts sodium hydroxide and 160 parts absolute methanol were refluxed for 6 hours. The solid thus obtained was washed free of alkali with methanol and the methanol removed by a water rinse. A yield of 57% theoretical was obtained. Concentrated sulfuric acid had little effect on the product at room temperature. Analysis for $C_2H_4O_2$ resulted in the following: carbon 37.8% as compared to 40.6% theoretical; hydrogen 6.74% as compared to 6.66% theoretical; ash 0.53%.

EXAMPLE VI

Four parts polyvinylene carbonate, 5 parts sodium carbonate and 150 parts water were heated in a polyethylene flask on a boiling water bath for 11 hours. The fine, cream-colored powder resulting was washed thoroughly with water and then with acetone. A yield amounting to 100% of theoretical was obtained. The product showed strong infrared hydroxyl absorption at 3.0 microns and no absorption in the carbonate region (5.5 microns).

Hydrolysis of the polyvinylene carbonate to the glycol may also be accomplished by reductive hydrolysis through the use of mineral acids. However, it is noteworthy that mineral acids are less satisfactory than alkalis. Weak acid concentrations produce only partial hydrolysis and strong acid solutions cause excessive charring and decomposition.

POLYVINYLENE GLYCOL DINITRATE

The nitrate ester of polyvinylene glycol is readily prepared from the latter material by any of various more or less standard methods of nitration.

There are numerous prospective uses of and reasons for interest in the polyvinylene glycol dinitrate of this invention. The material holds great promise, both theoretically and practically, as a solid propellant for guns and rockets. It is unique in that it possesses the highest known ratio of nitrate ester (—$ONO_2$) groups per CH residue and thus is potentially the most energy-rich polynitrate known. In addition to its possibilities in the field of propellants, the dinitrate may be of great interest in plastics in its partial or low-nitrated form, just as low-nitrated cellulose is utilized in Celluloid.

The polyvinylene glycol dinitrate of this invention should have a nitrate nitrogen content in the range of 15–18.66% and preferably of at least 17–17.9%. The substance should be relatively soluble in acetone, ethyl alcohol, ethyl acetate, tetrahydrofuran, and slightly soluble in ether. Softening points of the nitrate may be as low as 70° C. and as high as 300° C.

The following examples are illustrative of the methods by which polyvinylene glycol dinitrate may be prepared from polyvinylene glycol. The successful preparation of polyvinylene glycol dinitrate was assured by its physical and chemical properties such as nitrate analysis, infrared absorption etc.

EXAMPLE VII

One part of the polyvinylene glycol prepared according to any of the preceding methods is added with stirring to 21 parts of 100% nitric acid at 0–5° C. The temperature is then permitted to rise to ambient (40–50 minutes). The mixture was then cooled again to below —5° C. and 10.5 parts glacial acetic acid were added dropwise followed by 10.8 parts of acetic anhydride. During the addition of the acid and anhydride the temperature of the mixture was maintained below —5° C. with stirring. The temperature was then permitted to rise slowly to ambient with stirring (30–45 minutes). After about one hour at room temperature, the reaction solution was precipitated by adding gradually with vigorous stirring to an excess (400 ml.) of crushed ice. The finely divided white product was filtered and washed free of acid with ice water until the washings were free of acid. The product was then slurried for 10 minutes in 1% $NaHCO_3$ solution and washed thoroughly with water. The reaction product was finally dried in vacuo over phosphorous pentoxide and sodium hydroxide pellets. The final product burned well, leaving no carbonaceous residue. The infrared spectrum showed strong covalent nitrate present at 1645 and 1260 cm.$^{-1}$.

Analysis of the product showed a nitrate nitrogen content of 17.5–17.9%. It was soluble in acetone, ethyl alcohol, dimethylformamide, ethylacetate and tetrahydrofuran and slightly soluble in ether. A yield of 90–100% of theoretical was obtained. It should be noted that an acid wash of polyvinylene glycol prior to its nitration is desirable because it increases the stability of the resulting nitrate ester and possibly results in an increased yield as well.

EXAMPLE VIII

One part polyvinylene glycol was dissolved in 21 parts of white fuming nitric acid. After cooling to a temperature of from 0° C. to —10° C. a mixture of 13 parts glacial acetic acid and 145 parts acetic anhydride were added and the solution permitted to stand approximately 2 hours at room temperature. The mixture was then drowned in excess ice water and the last traces of acid removed by washing with ice water. The product was then washed with a 1% solution of sodium bicarbonate and rinsed thoroughly with water. A yield of 95–100% of theoretical for polyvinylene glycol dinitrate was obtained. The product showed a strong nitrate absorption at 1645 and 1260 cm.$^{-1}$ and had the same properties as recited under Example VII.

EXAMPLE IX

One part of the glycol polymer was dissolved in 20.6 parts white fuming nitric acid. Glacial acetic acid, 13 parts, and acetic anhydride, 14.5 parts, were then added at a temperature of from 0° to —10° C. and the mixture allowed to stand about 2 hours at room temperature. The isolation of the product, its stabilization with sodium bicarbonate and yield are as given in Example VIII.

EXAMPLE X

One part polyvinylene glycol was dissolved in 18 parts of 100% nitric acid and the reaction permitted to proceed at room temperature for approximately two hours. The isolation and stabilization of the product are as described in Example VIII. A yield of 70–80% of theoretical was obtained.

From the foregoing general discussion and detailed specific examples it will be evident that the invention provides a new, heretofore unknown, essentially linear polymer which is unique in that it possesses the highest known ratio of nitrate ester groups per carbon atom and therefore is potentially the most energy-rich polynitrate known. Thus the invention has provided an unique and promising polynitrate which because of the high proportion of nitrate ester groups may be regarded as the ne ultra plus member of its chemical class.

What is claimed and desired to be secured by United States Letters Patent is:

1. Polyvinylene glycol dinitrate having a softening point between 70° C. and 300° C.

2. Polyvinylene glycol dinitrate having a ratio of nitrate ester groups to carbon atoms of 1:1 and having a softening point between 70° C. and 300° C.

3. A nitrate ester of polyvinylene glycol having a softening point between 70° and 300° C. in which the repeating structural unit is

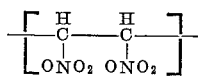

4. A nitrate ester of polyvinylene glycol having a nitrate nitrogen content in the range of 15–18.66% and having a softening point between 70° and 300° C.

5. A nitrate ester of polyvinylene glycol having a nitrate nitrogen content in the range of 17–17.9% and having a softening point between 70° C. and 300° C.

(References on following page)

References Cited by the Examiner

UNITED STATES PATENTS

| | | | |
|---|---|---|---|
| 913,653 | 2/1909 | Aigner | 260—467 |
| 1,660,651 | 2/1928 | Marshall et al. | 260—467 |
| 2,118,487 | 5/1938 | Burrows et al. | 260—467 X |
| 2,396,330 | 3/1946 | Lufkin | 260—467 |
| 2,455,937 | 12/1948 | Lowe | 260—91.3 X |
| 2,571,883 | 10/1951 | Hulse | 260—635 X |
| 2,722,525 | 11/1955 | Price et al. | 260—77.5 |

OTHER REFERENCES

Gilman, "Organic Chemistry," vol. 1, 755 (1953), John Wiley and Sons, Inc., New York.

Newman et al., "American Chemical Soc. Journal," vol. 75 (1953), page 1263.

LEON D. ROSDOL, *Primary Examiner.*

ROGER L. CAMPBELL, WILLIAM G. WILES,
*Examiners.*

L. A. SEBASTIAN, W. I. ANDRESS, B. R. PADGETT,
*Assistant Examiners.*